Aug. 21, 1956 R. K. DAVIS ET AL 2,759,507
COMBINATION CARRYING CASE AND SAW TABLE
Filed Dec. 15, 1953 4 Sheets-Sheet 3

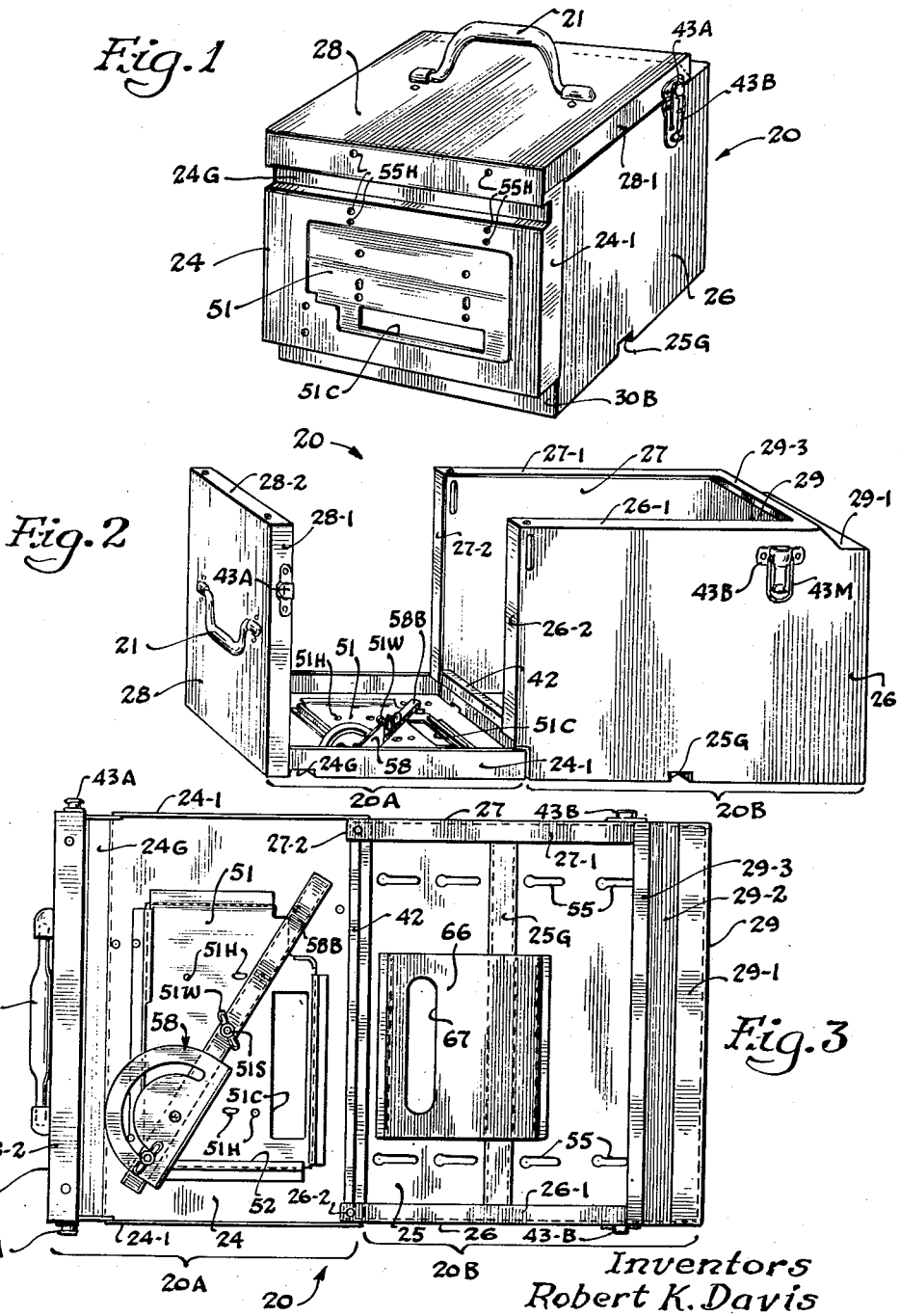

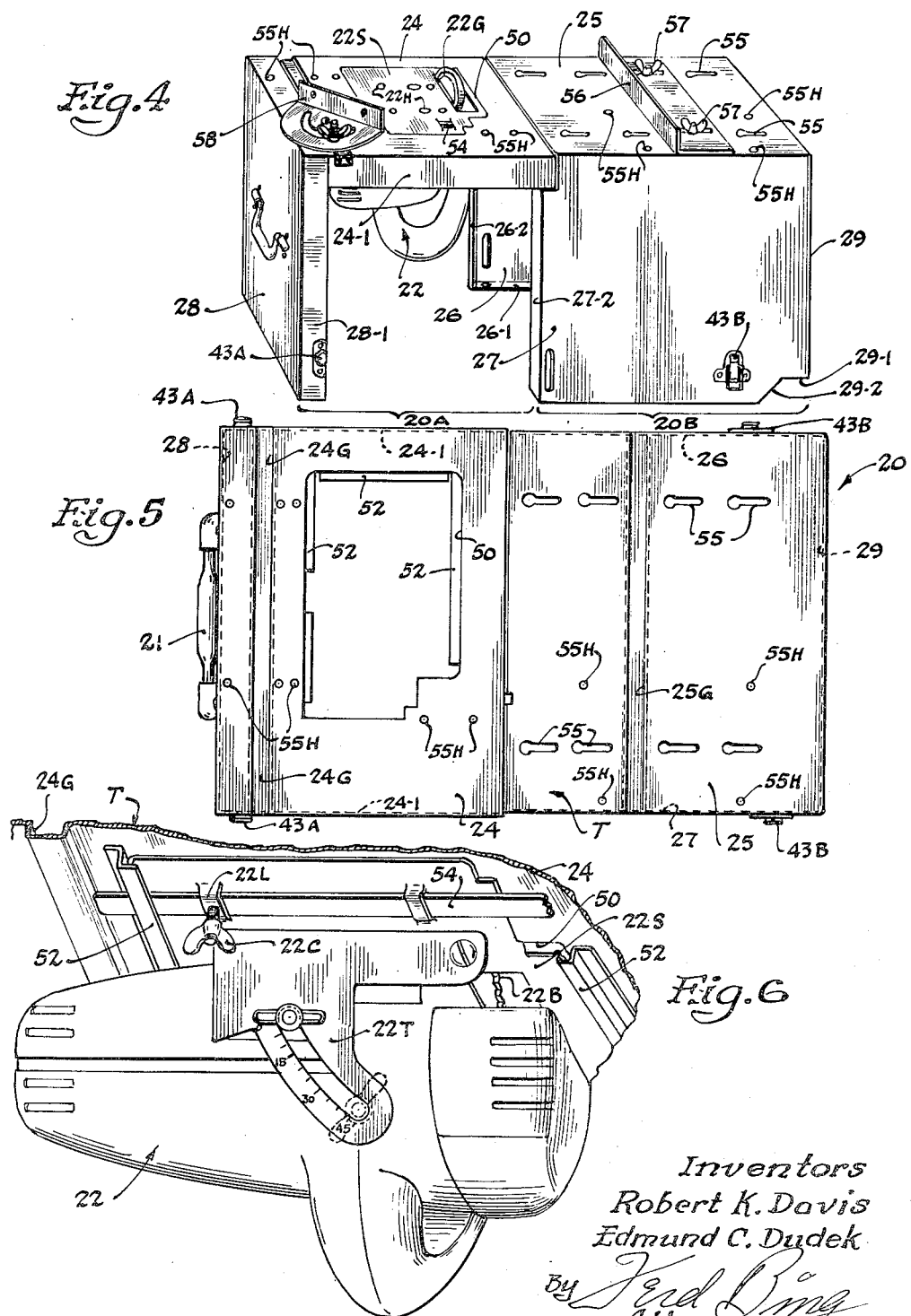

Inventors
Robert K. Davis
Edmund C. Dudek
By *Fred Bing*
Attorney

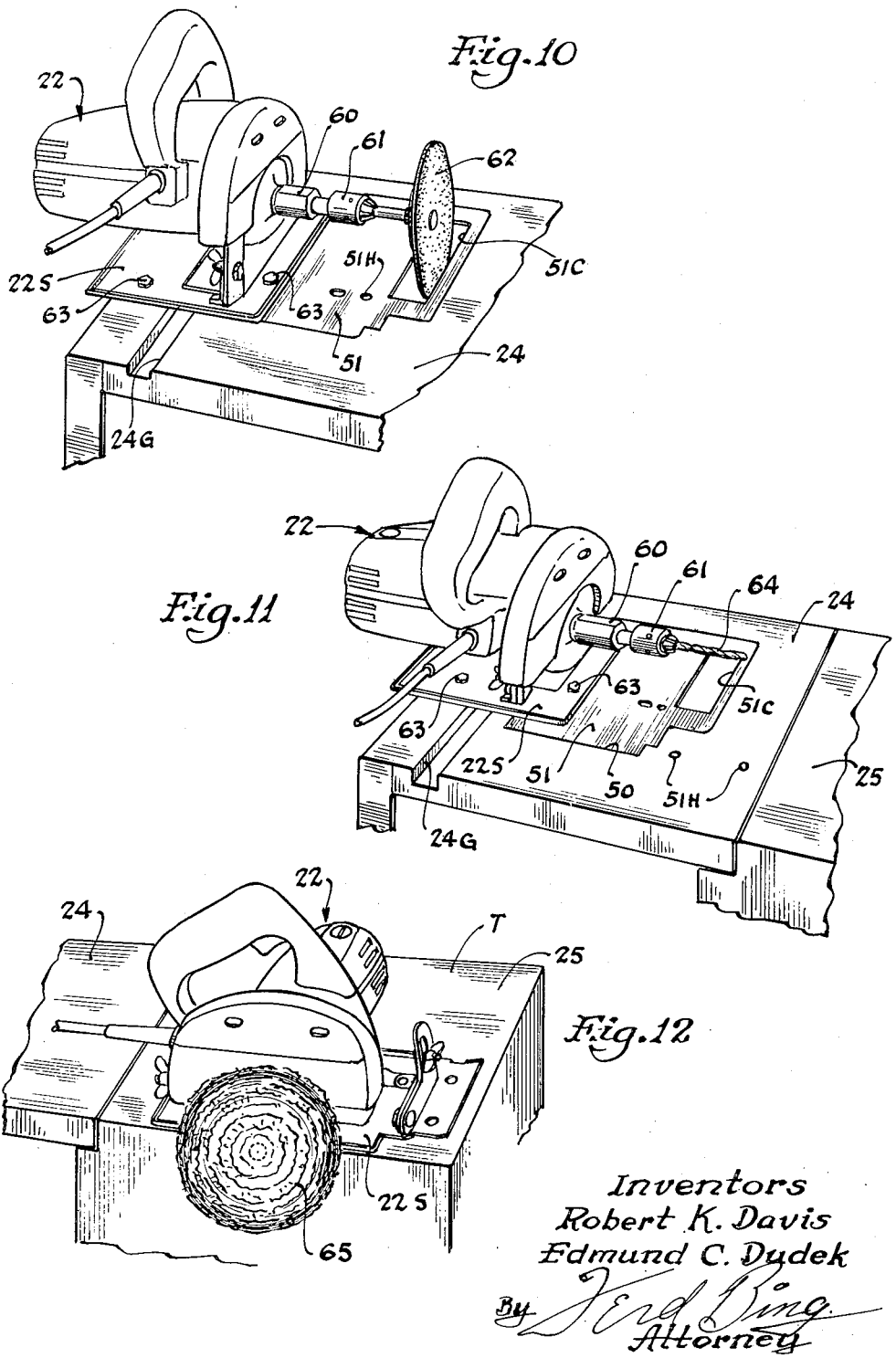

United States Patent Office 2,759,507

Patented Aug. 21, 1956

2,759,507

COMBINATION CARRYING CASE AND SAW TABLE

Robert K. Davis and Edmund C. Dudek, Evergreen Park, Ill., assignors to Portable Electric Tools, Inc., Chicago, Ill., a corporation of Illinois Application December 15, 1953, Serial No. 398,299

4 Claims. (Cl. 144—285)

This invention relates to portable tools, and particularly to a combined carrying case and saw table for use with a conventional portable electric saw.

Portable electric saws have found a wide range of usefulness based primarily upon the portable character thereof and their ability to perform sawing operations in various locations on construction projects and the like, but in addition to this, it has been found that such saws may be used to perform the functions of the usual circular saw by mounting such a portable electric saw in an inverted position in an opening in a saw table, thus to locate the shoe of the portable electric saw substantially in the plane of the saw table with the operative portion of the circular saw and the related guard projecting upwardly so that sawing operations may be performed by moving the work piece across the top of the saw table.

The saw tables that have been heretofore utilized as aforesaid in connection with portable electric saws, have been relatively complicated and heavy, so that these saw tables have found use primarily in work shops rather than on construction projects.

In view of the foregoing, it is the primary object of the present invention to simplify and extend the usefulness of portable electric saws so that such saws may be conveniently used on construction projects either for the usual portable sawing operations wherein the saw is moved across a stationary work piece, or as a stationary saw installation wherein the work piece is moved across a saw table and into cutting relationship with respect to the saw blade. More specifically, it is an object of the present invention to afford a combined carrying case and saw table for portable electric saws, and a related object is to afford such a carrying case that may be quickly and easily set up as a saw table which is rigid and relatively large.

Other and further objects related to the foregoing are to afford a combined carrying case and saw table wherein the conversion of the carrying case into a saw table involves merely the opening of the carrying case, and to afford stable leg or supporting structures for the saw table which are moved into position as an incident to the opening of the case.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention.

In the drawings:

Fig. 1 is a perspective view of the combined carrying case and saw table of the present invention, the structure being shown in its closed relation, wherein it functions as a carrying case;

Fig. 2 is a view of the case in its opened relationship;

Fig. 3 is a plan view of the case in the opened position of Fig. 2;

Fig. 4 is a perspective view of the case in an opened and inverted position wherein it serves as a saw table;

Fig. 5 is a plan view of the structure in its opened position;

Fig. 6 is a bottom perspective view illustrating the manner in which the portable electric saw is secured in position in the saw table;

Figs. 10, 11 and 12 are perspective views illustrating further uses of the present saw case and table structure.

Figure 7:
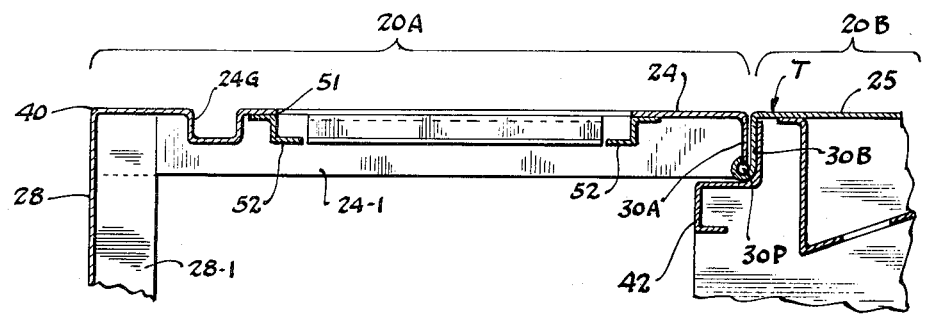
Fig. 7 is a fragmentary cross sectional view illustrating the hinge construction between the two units of the case.

For purposes of disclosure, the invention is herein illustrated as embodied in a combined saw table and carrying case 20 having a carrying handle 21 thereon and adapted to receive and house a conventional portable electric saw 22 along with the necessary accessories customarily used with such a saw. The case 20, when in the closed relation of Fig. 1, affords a convenient means for carrying and transporting the saw 22 and its related accessories, and the saw 22 may of course be removed from the carrying case 20 for convenient use in the normal manner as a portable saw that is moved and guided across the upper face of the work to perform its sawing operation. The carrying case 20 of the present invention may, however, be quickly and easily converted into a stable and relatively large saw table having a table top T in which the saw 22 may be mounted in an inverted relation, as shown in Fig. 4 of the drawings so that sawing operations may be performed by moving the work across the table top T of the work table and into cooperation with the upwardly projecting saw blade.

In affording such ready convertibility, the case 20 is constructed from six generally rectangular side walls 24, 25, 26, 27, 28 and 29 that are joined together to form two separately related and individually rigid units 20A and 20B that are in the present instance so related that they may be pivoted between two relationships in one of which a closed carrying case is afforded, and in the other of which the saw table is afforded.

The walls 24 and 25 may, for descriptive purposes, be considered as constituting a pair of walls in that these two walls constitute the upper surface of the saw table when the case is in its opened position, as shown in Fig. 4. Similarly, the walls 26 and 27 may, for descriptive purposes, be considered to be a pair in that these two walls are parallel to each other and are fixed to, and extend downwardly from, the opposite sides of the wall 25 in a rigid relationship thereto, as shown in Fig. 4. Further, the walls 28 and 29 may be considered to be a pair in that these two walls are arranged in a parallel relationship when the case is in its opened or saw-table relationship, as shown in Fig. 4, the wall 28 being rigidly related to the left-hand edge of the wall 24, while the wall 29 is connected rigidly between the right-hand edges of the walls 25, 26 and 27. As will be described in further detail hereinafter, the case 20 constitutes two units 20A and 20B, which are pivotally related to each other and which may be moved between the opened position of Fig. 4 wherein the case constitutes a saw table, and the closed position of Fig. 1, wherein the case constitutes a carrying enclosure for the portable saw 22. This pivotal connection of the units 20A and 20B is in the present instance afforded by a hinge 30, which takes the form commonly known as a piano hinge, having a pivot pin 30P and leaves 30A and 30B that are joined respectively to the units 20A and 20B of the case 20.

Figure 8:
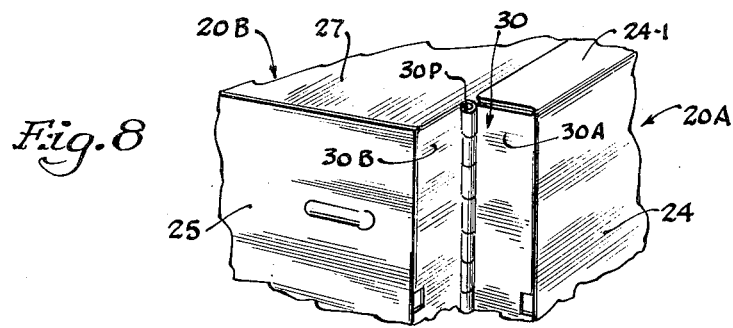
Fig. 8 is a perspective view illustrating further details of the hinge structure.

In the formation of the units 20A and 20 B, the various walls are formed in each instance with edge flanges so as to impart added strength and rigidity to the various walls, which are made from sheet metal, and it is to be observed that in the present instance, the hinge leaves 30A and 30B are formed from integral flange portions of the walls 24 and 25, as will be evident in Figs. 7 and 8 of the drawings.

With respect to the unit 20A of the case, it will be noted that the walls 24 and 28 are formed from a single sheet of metal in the present instance, and this sheet is bent as at 40 to a right angular relationship, thus to afford the walls 24 and 28, and the wall 28 has side flanges 28–1 and an edge flange 28–2 turned inwardly, as will be evident in Figs. 2, 4 and 7. The wall 24 has similar flanges 24–1 that are folded downwardly, as viewed in Figs. 4 and 7, and the flanges 24–1 overlie portions of the flange 28–1 near the corner 40, as will be evident in Figs. 4 and 7. These flanges are secured together as by welding, thus to rigidly hold the wall 28 in a right angular relationship with respect to the wall 24.

Bearing in mind that the flanges or hinge leaves 30A and 30B are disposed in a right angular relationship with respect to the walls 24 and 25, it will be evident, as shown in Figs. 4 and 7 of the drawings, that these hinge leaves or flanges constitute abutments which are engaged when the units of the case are folded to the relationship shown in Fig. 4, and this serves to limit the pivoting of the units 20A and 20B, and assures that the walls 24 and 25 that afford the table top T are maintained in a coplanar relationship.

The hinge 30 is displaced in a right-hand direction, as viewed in Figs. 4 and 7, from the open left-hand side of the unit 20B as this open side is defined by a border flange 42, and thus when the case is closed, the side flanges 24–1 will overlap the border flange 42 and provide a complete closure along these meeting lines of the case elements.

When the case 20 is fully closed, the wall 28 is arranged to extend along the tops of the walls 26 and 27, as viewed in Figs. 1 and 2, and means are afforded for locking the unit 30A in its closed relationship. Such means comprise releasable fasteners having one element 43A thereof mounted on the flanges 28–1, and second element 43B mounted on the respective side walls 26 and 27, and having movable fastening elements 43M that are adapted to be moved to effective relationships wherein they engage the fastening elements 43A. When the fastening elements are thus in their effective positions, the case may be lifted by means of the handle 21.

As will be evident in Figs. 2 and 4, the case 20 in side elevation is rectangular rather than square in form, and because of this, the edge of the wall 28 that is defined by the flange 28–2 does not reach entirely to the plane of the wall 29 when the case is closed. Thus, at this corner of the case that is located at the upper edge of the wall 29, as viewed in Figs. 1 and 2, the wall 29 is formed with what may be termed a rabbeted groove in that a horizontal flange 29–1 is bent inwardly somewhat below the plane defined by the upper edges of the walls 26 and 27, and this flange 29–1 is then bent upwardly at an angle to define a flange 29–2 that extends upwardly to the plane of the upper edges of the walls 26 and 27. At this point, the flange 29–2 is bent to a horizontal plane to define a flange 29–3 that is located in the plane of the upper edges of the walls 26 and 27, and this flange 29–3 is joined to flanges 26–1 and 27–1 that are formed respectively on the upper edges of the walls 26 and 27, as viewed in Fig. 2 of the drawings. The walls 26 and 27 also have edge flanges 26–2 and 27–2 that are located along the edges of these walls at the left-hand ends thereof, as viewed in Fig. 2, and the flanges 26–2 and 27–2 are joined at their lower ends, as viewed in Fig. 2, to the flange 42. In this respect, it is to be noted that the flange 42 is U-shaped in character, as shown particularly in Fig. 7 of the drawings, and this U-shaped cross section imparts additional strength along the adjacent edge of the bottom wall of the carrying case.

Due to the provision of the rabbeted groove by the flanges 29–1 and 29–2, it will be evident that the wall 25, which forms one portion of the table top T, is rendered somewhat longer than would otherwise be the case, and this additional length in the saw table is, of course advantageous.

When the carrying case 20 is closed and is being used to house and transport the portable electric saw 22 and the related attachments, the outer surfaces thereof are substantially closed for all practical purposes, but it is to be observed that when the case is to be opened and used as a saw table, an opening 50 may be afforded in the wall 24 to receive the saw 22 in the desired position of use. This opening 50 is so formed and arranged that when the saw 22 is inverted, the usual shoe 22S of the saw will span and substantially close the opening 50. At other times, that is when the case 20 is closed and is being used to transport the saw 22, this opening 50 is closed by removable closure plate 51 that is shown in Fig. 1 of the drawings and which is held in place in a removable manner, as will be described. The closure plate 51 has a rectangular opening 51C of relatively small size therein to afford clearance for sanding disks and the like in certain uses of the table, as will be described. The opening 50, as shown in Figs. 3, 5, 6 and 7, has a plurality of Z-shaped supporting flanges 52 extending along opposite sides and one end of the opening, and these flanges are so arranged that the side edges and one end edge of the shoe 22S of the saw may be moved into position on the projecting portions of the flanges thus to support the shoe of the saw 22 beneath the opening 50. The shoe 22S would, of course, under such circumstances be capable of movement in one direction away from the end supporting flange 52, and therefore means are provided for locking the shoe 22S against endwise displacement. Thus, as best shown in Fig. 6 of the drawings, the shoe 22S of one form of conventional portable saw 22 has a pair of struck up loops 22L formed thereon, and when inverted as shown in Fig. 6, these loops project downwardly from the shoe 22S. These loops are normally utilized to receive and adjustably support the bar portion of a rip guide, and for fixing such a bar in position, a wing headed clamping screw 22C is extended through one of the loops 22L. This structure of the shoe 22S is utilized in the present instance by providing a locating or locking bar 54 that may be slid through the loops 22L and into a locking opening formed in the vertical wall of the lefthand supporting flange 52, as viewed in Fig. 6 of the drawings.

With the portable saw 22 in this position, the saw blade 22B extends upwardly through the shoe 22S, and the usual pivoted guard mechanism 22G covers the projecting portion of the saw blade 22B in such a manner that the work may be moved rearwardly across the table top T to shift the guard 22G to its inactive position so that the desired sawing operation may be performed.

In order that the usual work guiding arrangements may be afforded on the table top T, a plurality of keyhole slots 55 are provided in the wall 25 so that an angle shaped work guide member 56 may be fixed in different positions thereon by means of bolts and wing nuts 57, as shown in Fig. 4 of the drawings. In the walls 24 and 25, a plurality of sets of mounting holes 55H are also provided to enable the saw 22 to be mounted on top of the table top T for purposes that will be discussed hereinafter, and the plate 51 has several similar holes 51H formed therein for similar use.

In addition, the walls 24 and 25 are provided with transverse grooves 24G and 25G in which slidable work guiding elements of conventional form may be moved along paths parallel to the plane of the saw blade 22B. Such work positioning elements may take the form of the usual slidable guide, or may take the form of a miter guide 58 that is shown in Fig. 4 of the drawings. The miter guide 58 is used in the present instance to hold the closure plate 51 in position against the flanges 52, and as shown in Figs. 2 and 3, the bar 58B portion of the guide 58 extends angularly across the opening 50 on the inside of the case, and is secured to the closure plate 51 by a stud 51S that is fixed on the inner surface of the cover 51 so as to project through a hole in the bar 58B, a wing nut 51W being threaded onto the inner end of the stud 51S to hold the parts together.

It should be observed that when the saw 22 is mounted in its operative position on the wall 24, it may be tilted through the use of the usual tilting mechanism 22T so that angular cuts may be made within the range of adjustment afforded in the portable saw 22, and also that the usual depth of cut adjustment of the saw may also be used as desired.

With the structure that has thus been described, the table top of the saw table may be utilized in such a way that the portable electric saw 22 provides a power source for other types of work performing operations, and in these additional working operations, the saw 22 is mounted on top of the table top T in various locations so as to afford a horizontal drive shaft for various work performing accessories. Thus, in Fig. 10 of the drawings, the saw 22 is mounted with the shoe 22S thereof disposed on the top of the wall 24, and with the output shaft of the saw, or in other words the saw arbor, extending in a horizontal direction that is parallel to the forward edge of the table top. An adapter fitting 60 and a chuck 61 are connected to each other and to the saw arbor, and a sanding disc 62 of conventional form is mounted in the chuck 61 so that the sanding disc is located over the opening 51C that is afforded in the plate 51. The saw table thus serves as a work support on which the work may be mounted and moved into cooperation with the sanding disc 62.

Such mounting of the saw 22 is accomplished by utilizing one of the sets of mounting holes 55H, and these mounting holes 55H in each set are arranged so as to correspond with mounting holes 22H that are provided in the shoe 22S. Bolts 63 are extended through the holes in the shoe and the holes 55H in the table top T or the holes 51H in the plate 51 to fix the saw 22 in position on the table top.

In Fig. 11 of the drawings, the saw 22 is illustrated in the same position as in Fig. 10, but in this instance the chuck 61 has a drill bit 64 fixed therein so that horizontal drilling operations may be performed by moving the work along the table top T and into engagement with the drill bit.

In Fig. 12 of the drawings, the saw 22 is mounted in what may be termed a "side-mount" position so that an output shaft extension such as that afforded by the adapter 60 and the chuck 61 hereinbefore described will project beyond the forward wall of the saw table, and in this instance, the saw 22 is mounted on the wall 25. In this instance another set of holes 55H is of course utilized, but similar attaching bolts 63 are used. With the saw 22 mounted in this relation, a buffing wheel or disc 65 may be supported thereon so that buffing operations may be performed in the usual manner. It will be recognized, of course, that other accessories such as a grinding wheel or face plate may be associated with the saw 22 when it is mounted in any of the positions shown in Figs. 10, 11 and 12.

Figure 9:
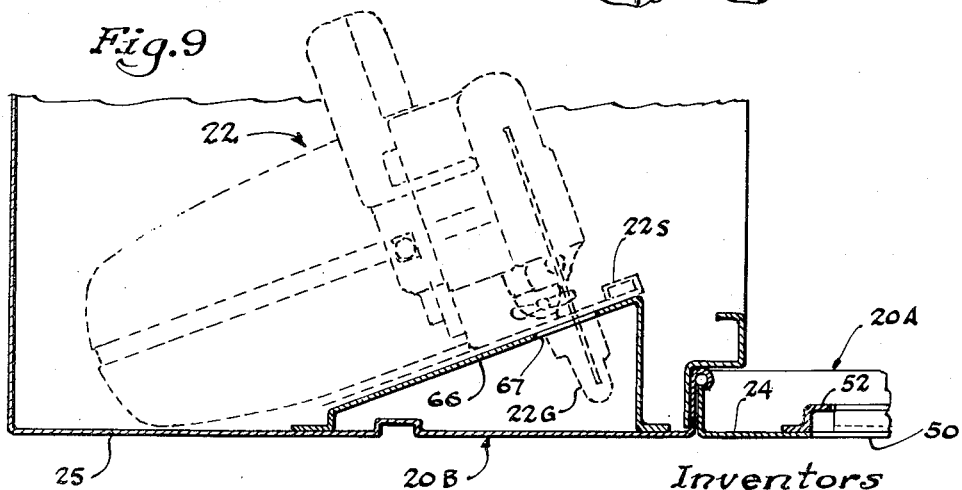
Fig. 9 is a cross sectional view showing how the saw is positioned in the carrying case.

When the saw 22 is to be transported in the case, it is readily supported and located in a convenient manner on the inner surface of the wall 25 of the case through the provision of an upstanding angular bracket 66 fixed on such inner face of the wall 25, as shown in Figs. 3 and 9, and which has a transverse opening 67 formed therein, as shown in Figs. 3 and 9 of the drawings. This opening 67 is adapted to receive the saw guard 22G which projects downwardly into the opening 67. This affords an interlock between the saw structure and the case so as to prevent undesired shifting of the saw within the case during transportation of the case.

From the foregoing description, it will be apparent that the present invention affords a novel and advantageous combined carrying case and saw table whereby the usefulness of portable electric saws is materially extended. It will also be apparent that the structure provided by the present invention enables a carrying case to be quickly and easily converted into a saw table that is rigid in structure, and which will enable the user to perform most of the operations heretofore performed with bench saws.

It will also be evident that with the saw table of the present invention, the use of the saw in its position beneath the table is accomplished in such a way that all of the normal and usual adjustments of the saw are readily accessible to the operator through the open forward side of the table-supporting structure. Moreover, the location of the saw in this position opposite the open front and rear sides of the saw supporting structure enables cooling air to flow freely beneath the table and through and about the operating parts of the saw. This, of course, results in increased reliability of operation of the saw.

Thus, while we have illustrated and described the preferred embodiment of our invention, it is to be understood that this is capable of variation and modification and we therefore do not wish to be limited to the precise details set forth, but desire to avail ourselves of such changes and alterations as fall within the purview of the following claims.

We claim:

1. In a combined carrying case and saw table for portable electric saws, a boxlike member having a first pair of rectangular walls pivoted together along adjacent edges and adapted when supported in a common plane to afford a saw table, a second pair of rectangular walls fixed respectively in a right angular rigid relation to the edges of said first pair of walls at the edges that are remote from and parallel to said pivot, and a third pair of walls fixed to right angularly related edges of connected ones of said first and second pairs of walls to cooperate with said first and second pairs of walls to form a closed carrying case when the walls of said first pair are moved to a right angular relation to each other, one of the walls of said first pair having a mounting opening therein in which a portable saw may be mounted, and a carrying handle mounted on the outside of one of the walls of said second or third pairs of walls.

2. In combined carrying case and saw table for portable electric saws, a boxlike member having a first pair of rectangular walls pivoted together along adjacent edges and adapted when supported in a common plane to afford a saw table, a second pair of rectangular walls fixed respectively in a right angular rigid relation to the edges of said first pair of walls at the edges that are remote from and parallel to said pivot, and a third pair of walls fixed to right angularly related edges of connected ones of said first and second pairs of walls to cooperate with said first and second pairs of walls to form a closed carrying case when the walls of said first pair are moved to a right angular relation to each other, one of the walls of said first pair having a mounting opening therein in which a portable saw may be mounted, means disposed about said opening and on the wall in which said opening is formed for releasably securing the shoe of such a portable saw in spanning relation to said opening, and a carrying handle mounted on the outside of one of the walls of said second or third pairs of walls.

3. A combined six-sided tool box and work table for a portable electric saw comprising, an end panel, a bottom panel and two side panels as one unit in the box, a top panel and another end panel as a second unit for the box having dimensions corresponding, respectively, to said bottom panel and the first-named end panel, means affording a hinged connection between the two units so that the top panel and end panel in the second unit may be folded over upon the first unit in one relation to complete the six sides of the tool box and enclose a space for receiving said saw, said hinged connection affording a second relation between the two units wherein the second is folded out upon the first disposing the outer wall of the second-named end panel in the plane of the outer wall of the bottom panel to afford a horizontal table upon which the work pieice for the saw may be located and at the same time disposing the top panel in parallel spaced relation to the first-named end panel to afford a pair of stable leg structures for said table, the second-named end panel having an opening therein togethed with means for stably mounting said saw on the inner face thereof with the blade projecting through the slot and exposed on said table when the units are arranged in the second-named relation.

4. In a combined carrying case and saw table for portable electric saws, a two-section boxlike member having a body section comprising four walls secured together to afford a portion of a box that is open on two adjacent sides and a closure section having two walls rigidly related to each other in a right angular relation and adapted in a first relation to close the two open sides of said body section and thereby afford a closed carrying case for such a saw, means for locating said closure section in a second relation with said body section wherein a selected one of the walls of said closure section is disposed in a coplanar relation with a selected wall of said body section to afford an extended table, and in which the other wall of said closure section is located remote from said body section to afford a leg structure, means for holding said sections in either of said relation, means affording a saw mounting opening in one of said selected walls, means on said last mentioned wall for fixedly mounting a portable saw in inverted position in said opening, and means on said selected walls for mounting work guiding means for guiding work into cooperation with a saw that is thus mounted.

References Cited in the file of this patent

UNITED STATES PATENTS

| | | |
|---|---|---|
| 526,436 | Gundlach | Sept. 25, 1894 |
| 633,203 | Makinen | Sept. 19, 1899 |
| 1,313,107 | Niewinski | Aug. 12, 1919 |
| 1,334,792 | Rankin | Mar. 23, 1920 |
| 1,470,166 | Holland | Oct. 9, 1923 |
| 1,663,486 | Wertz | Mar. 20, 1928 |
| 2,020,216 | Sarac | Nov. 5, 1935 |
| 2,046,244 | Carner | June 30, 1936 |
| 2,139,293 | Wallgren | Dec. 6, 1938 |
| 2,496,716 | Hanna | Feb. 7, 1950 |
| 2,697,460 | Barnett | Dec. 21, 1954 |

FOREIGN PATENTS

| | | |
|---|---|---|
| 442,519 | Germany | Apr. 2, 1927 |